(12) United States Patent
Hosokawa et al.

(10) Patent No.: US 6,977,788 B2
(45) Date of Patent: Dec. 20, 2005

(54) METHOD AND APPARATUS FOR ADJUSTING ANGULAR POSITION OF MAGNETIC HEAD UNIT

(75) Inventors: Akihiro Hosokawa, Tokyo (JP); Satoshi Yamaguchi, Tokyo (JP); Makoto Ohashi, Tokyo (JP); Mitsuo Hayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 462 days.

(21) Appl. No.: 09/836,201

(22) Filed: Apr. 18, 2001

(65) Prior Publication Data

US 2002/0008931 A1    Jan. 24, 2002

(30) Foreign Application Priority Data

Jun. 13, 2000   (JP) .............................. 2000-177375

(51) Int. Cl.$^7$ ............................................ G11B 21/02
(52) U.S. Cl. ..................................................... 360/75
(58) Field of Search ..................... 360/75, 76, 77.03, 360/78.11, 78.04; 72/16.2; 29/603.03

(56) References Cited

U.S. PATENT DOCUMENTS

| | | | |
|---|---|---|---|
| 5,043,835 A | * | 8/1991 | Watanabe et al. ........ 360/294.7 |
| 5,256,850 A | * | 10/1993 | Maegawa et al. ........ 219/121.69 |
| 5,341,256 A | * | 8/1994 | Murata et al. ................ 360/75 |
| 5,347,415 A | * | 9/1994 | Murata et al. ............... 360/137 |
| 5,537,276 A | * | 7/1996 | Mukae et al. ............. 360/291.6 |
| 5,687,597 A | | 11/1997 | Girard |
| 5,712,463 A | * | 1/1998 | Singh et al. .............. 219/121.6 |
| 5,728,240 A | * | 3/1998 | Yamamoto et al. ......... 148/563 |
| 5,832,764 A | * | 11/1998 | Girard ........................ 72/16.3 |
| 5,956,212 A | * | 9/1999 | Zhu ........................ 360/245.4 |
| 5,984,159 A | | 11/1999 | Ostendarp et al. |
| 6,011,239 A | | 1/2000 | Singh et al. |
| 6,057,975 A | * | 5/2000 | Yaeger et al. ................. 360/75 |

FOREIGN PATENT DOCUMENTS

| | | | | |
|---|---|---|---|---|
| JP | A-61-177692 | | 8/1986 | |
| JP | A-1-227279 | | 9/1989 | |
| JP | 3-178021 A | | 8/1991 | |
| JP | A-3-192586 | | 8/1991 | |
| JP | 5-159501 A | | 6/1993 | |
| JP | 5-189906 A | | 7/1993 | |
| JP | 9-288874 A | | 11/1997 | |
| JP | 10-269538 A | | 10/1998 | |
| JP | A-10-269538 | | 10/1998 | |
| JP | A-11-21141 | | 1/1999 | |
| JP | A-2000-100104 | | 4/2000 | |
| JP | A-2000-339894 | | 12/2000 | |
| JP | 02001357645 A | * | 12/2001 | ........... G11B 21/24 |

* cited by examiner

*Primary Examiner*—David Hudspeth
*Assistant Examiner*—K. Wong
(74) *Attorney, Agent, or Firm*—Oliff & Berridge, PLC (57) ABSTRACT

A significant change in the static angular position can be produced from a small physical displacement of the flexible member. The flexible member 12 in a magnetic head unit 95 is stressed for adjusting the static angular position. Simultaneously, the stressed areas 14 are irradiated by a laser beam LA.

13 Claims, 9 Drawing Sheets

METHOD AND APPARATUS FOR ADJUSTING ANGULAR POSITION OF MAGNETIC HEAD UNIT

BACKGROUND OF THE INVENTION

The present invention relates to a method and an apparatus for adjusting the static angular position of a floating-type magnetic head unit.

It is an essential requirement of a floating-type magnetic head unit to hold at a higher accuracy the static angular position of a magnetic head supported with a head support for achieving a high density recording and reproducing. The static angular position of the magnetic head includes a pitch angle and a roll angle.

In common, the magnetic head in the magnet head unit is bonded by adhesive to one end of the head support (a suspension) and its static angular position may be displaced from a desired angle.

The magnetic head is an expensive component manufactured through elaborate processes and mounted on the head support at a high accuracy in the magnetic head unit. Even if its static angular position is inadequate in the magnetic head unit, the magnetic head shall hardly be discarded as a defective component.

A means for adjusting an error of the static angular position has hence been developed where a mechanical pressure is applied with the use of a pressing jig. Such a static angular position adjusting method using the pressing jig includes the steps of applying the pressure onto one point along the axis on a load beam with the other point acting as a fulcrum thus to bend the load beam or adjust the static angular position of the magnetic head.

However, when the load beam is bent by the mechanical pressure, it may easily be sprung back by its restoring effect. Accordingly, the load beam has to be bent to a degree greater than the desired deflection for the static angular position.

As the load beam is bent largely, a gap may be created between a flexible member and a projection (dimple) through which a load is applied from the load beam to the flexible member, hence resulting in the generation of so-called dimple floating. The dimple floating inhibits the load beam from applying a load onto the flexible member, thus declining the floating characteristic of the magnetic head.

Alternatively, the flexible member joined to the free end of the load beam may be bent for adjusting the static angular position. In this case, the drawback attributed to the bend of the load beam will remain.

Most of the magnetic head units used in magnetic disk drives for improving the impact resistance are equipped with a limiter mounted on the flexible member to limit the movement range of a slider. The magnetic head unit of such a type becomes small in the permissive range of displacement of the flexible member due to the limiter. As a result, the displacement may hardly be adjusted to a desired degree for determining the static angular position.

SUMMARY OF THE INVENTION

It is hence an object of the present invention to provide a method and an apparatus for adjusting the static angular position of a magnetic head unit where a significant change in the static angular position can be obtained from a small displacement of the flexible member.

For achieving the above object, a static angular position adjusting method of the present invention is provided for adjusting the static angular position of a magnetic head unit. The magnetic head comprises a head support and a magnetic head. The head support includes a flexible member to which the magnetic head is mounted.

In the magnetic head unit, a bend is applied onto the flexible member for adjusting the static angular position and a laser beam is irradiated onto areas of the flexible member where the bend is applied.

Upon displaced by the bend applied for adjusting the static angular position, the flexible member generates a stress equivalent to the bend. The areas of the flexible member where the bend is applied are then exposed to a laser beam. Accordingly, the stress generated throughout the areas can be relieved by the heat of the laser beam. As a result, the restoring effect at the areas of the flexible member exposed to the laser beam will be declined thus allowing the flexible member to be displaced to a degree close to the desired displacement. More particularly, the flexible member can be displaced to a large degree by application of a small displacement of the bend. Therefore, a significant change in the static angular position can be produced from a small displacement of the flexible member.

Some prior art for relieving a thermal stress with the use of a laser beam are disclosed in Japanese Patent Application Laid-open Nos. 3-178021 and 10-269538. Those techniques are however intended for bending the load beam before a magnetic head is mounted on the load beam but not teaching any bending process in the magnetic head unit which has a magnetic head mounted on a load beam. When the load beam has been bent by the action of any prior, the static angular position of the magnetic head mounted on the load beam may be displaced from a desired angle. Hence, no static angular position adjusting means will be realized.

The present invention is directed towards a technique of correcting an error of the static angular position generated after the magnetic head is mounted to the load beam and clearly different from the prior art.

It is another object of the present invention to provide a static angular position adjusting apparatus for embodying the above static angular position adjusting method.

DETAILED DESCRIPTION OF THE PREFERRED EMBODIMENTS

Figure 1:
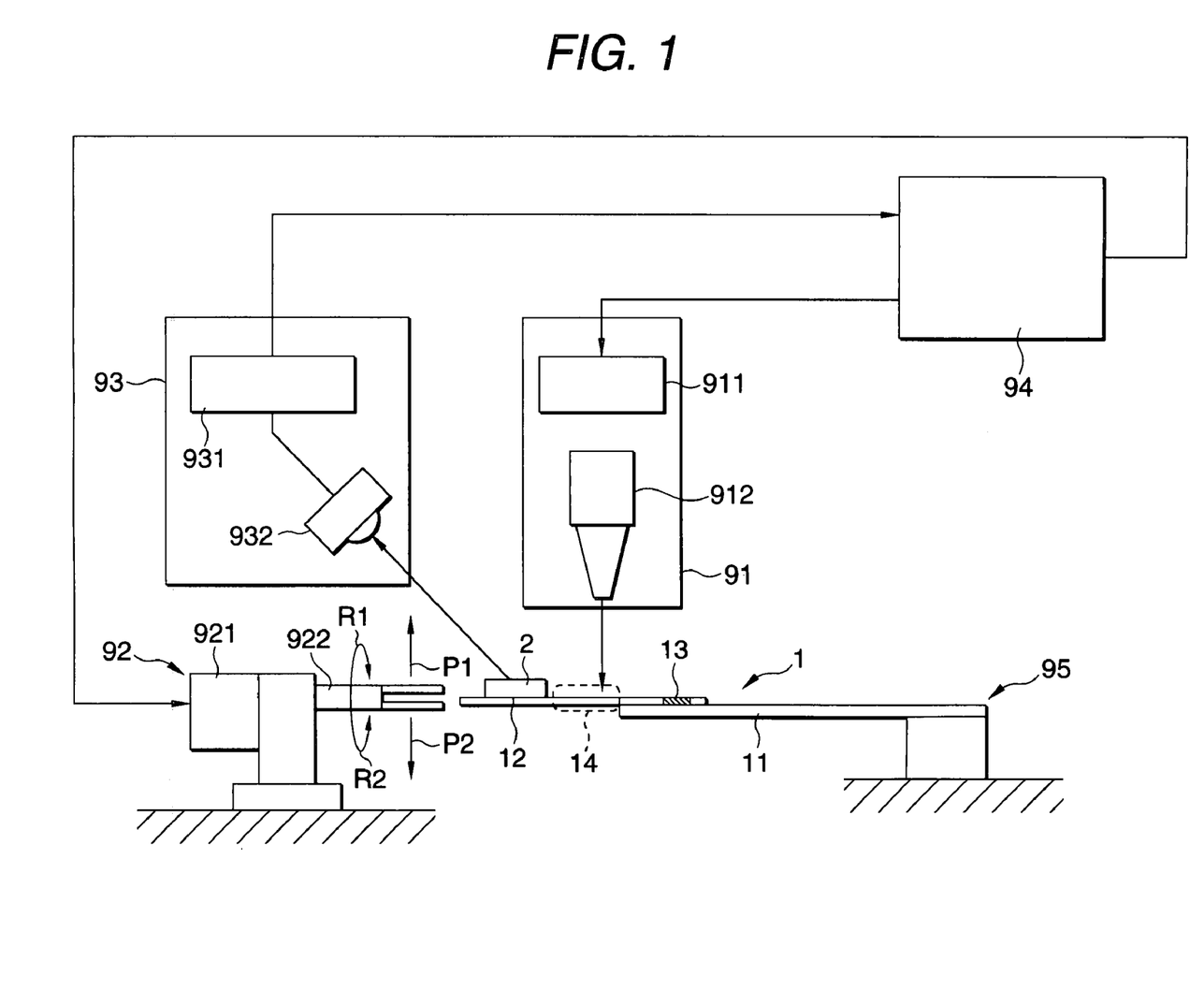
FIG. 1 is a view showing a static angular position adjusting apparatus for implementing a static angular position adjusting method according to the present invention.

FIG. 1 is a view showing a static angular position adjusting apparatus used directly for carrying out a static angular position adjusting method according to the present invention. The static angular position adjusting apparatus shown comprises a laser emitter unit 91, an angular position modifying unit 92, a displacement measuring unit 93, and a controller unit 94 which are operated in a combination for controlling the static angular position of a magnetic head unit 95.

Figure 2:
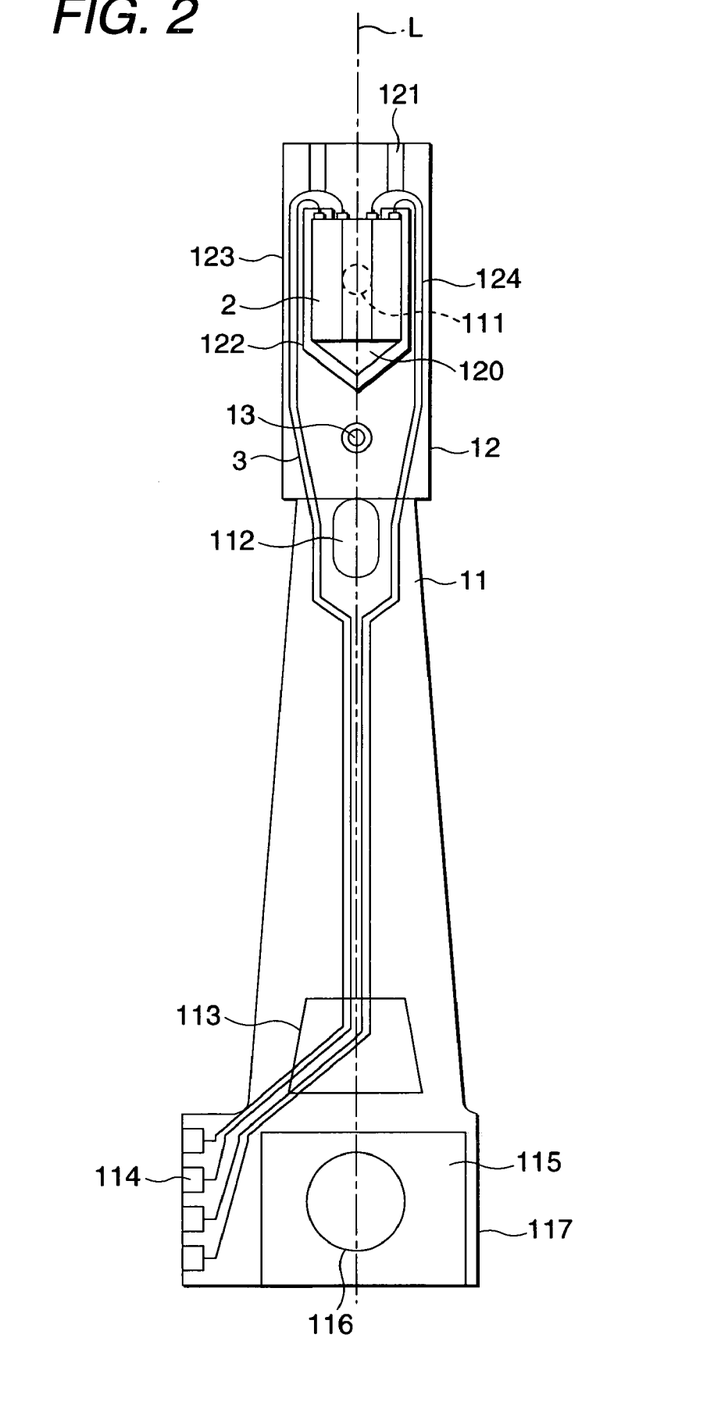
FIG. 2 is a front view of a magnetic head unit for use in the static angular position adjusting method of the present invention.
Figure 3:
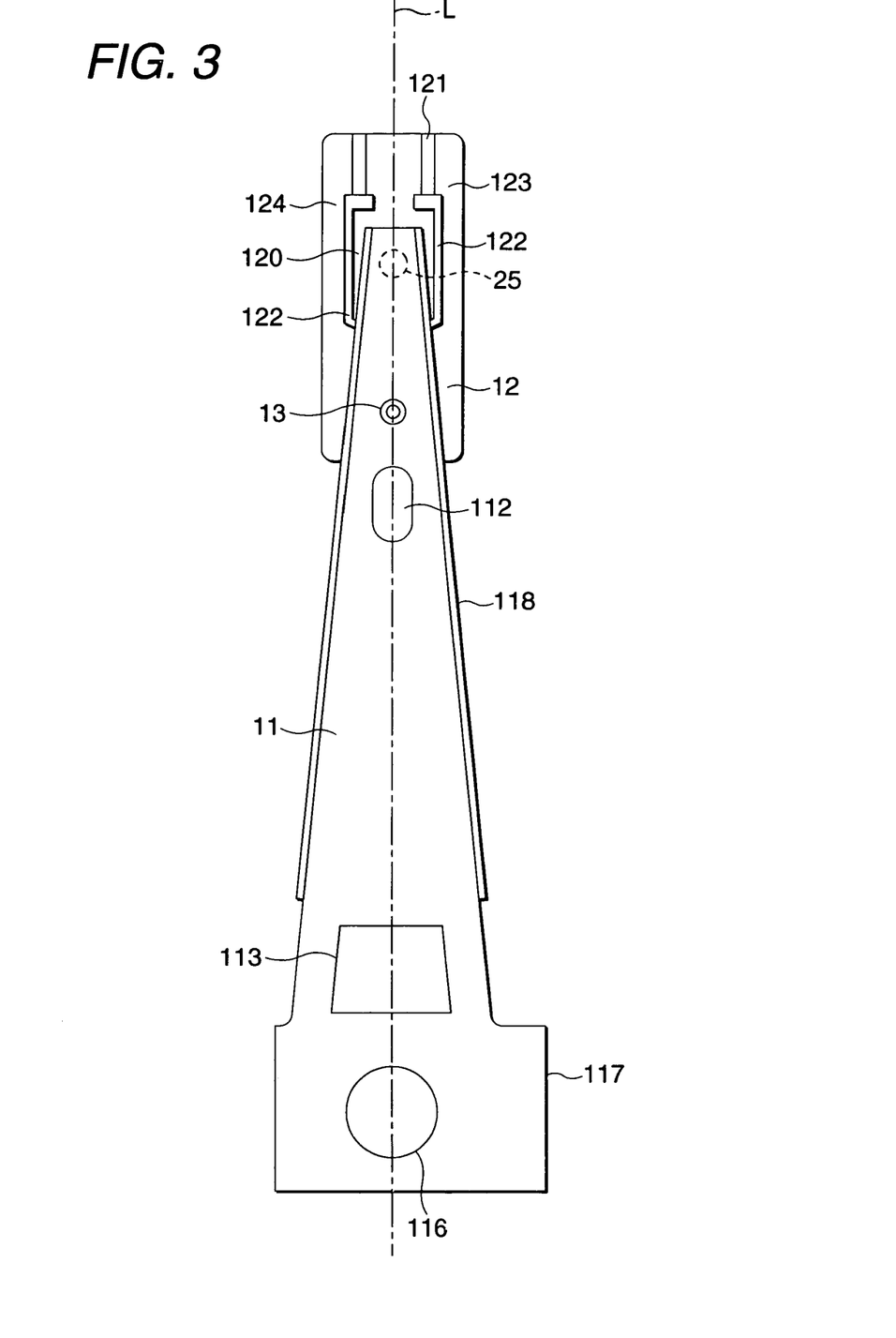
FIG. 3 is a bottom view of the magnetic head unit shown in FIG. 2.

FIG. 2 is a front view of the magnetic head unit controlled by the static angular position adjusting method of the present invention. FIG. 3 is a bottom view of the magnetic head unit shown in FIG. 2. As shown in FIGS. 1 and 2, same components are denoted by same numerals.

The magnetic head unit 95 includes a head support 1 and a magnetic head 2. The head support 1 comprises a load beam 11 and a flexible member 12. The shown load beam 11 has a dimple 111 provided close to the free end along a longitudinal axis L thereof. The load beam 11 also has two bent portions 118 provided at both ends thereof along the widthwise direction. The bent portions 118 are provided for increasing the overall rigidity. The load beam 11 has an opening 112 provided therein for improving the traceablity of the magnetic head 2 over a recording medium (not shown). Moreover, the load beam 11 has a mounting hole 116 provided in a mounting portion 117 thereof for mounting via a washer 115 to a positioning unit. The load beam 11 has an opening 113 provided therein adjacent to the mounting hole 116 for increasing the overall elasticity of the load beam 11.

The flexible member 12 is a thin leaf spring joined at one side to a surface of the load beam 11 where the projection 111 is located and remains stressed by a pressing load of the projection 111. The flexible member 12 is joined at the other side to the magnetic head 2. More specifically, the flexible member 12 is tightened at a joint 13 by swage locking or any appropriate means to the projection 111 side of the load beam 11. The swage locking may be replaced by a spot welding. The flexible member 12 has a tongue portion 120 provided in the center thereof. The tongue portion 120 is bonded at one end to a cross portion 121 of the flexible member 12. The cross portion 121 of the flexible member 12 extends over two flange portions 123 and 124. A groove 122 is provided between the tongue portion 120 and the two flange portions 123 and 124 extending around the tongue portion 120. The magnetic head 2 is bonded by adhesive to one side of the tongue portion 120 to be in spring contact with the projection 111. A lead 3 is connected to the output electrode of a magnetic converter mounted in the magnetic head 2.

Referring back to FIG. 1, the description is continued. The static angular position adjusting apparatus shown in FIG. 1 is used for controlling the static angular position of the magnetic head unit. The static angular position includes a pitch angle and a roll angle. The pitch angle is an angle between the longitudinal axis L of the load beam 11 (FIGS. 2 and 3) and a longitudinal reference line. The roll angle is an angle about the longitudinal axis L. The static angular position may vary depending on the assembly of the magnetic head 2 relative to the head support 1, the displacement of the head support 1, the weight of the lead 3, and other conditions. The apparatus and method for adjusting the static angular position according to the present invention is intended for accurately controlling the static angular position to a desired level.

The laser emitter unit 91 emits a laser beam LA to areas 14 of the flexible member 12 between the magnetic head 2 and the joint 13 which joins the flexible member 12 and the load beam 11. The laser emitter unit 91 may be selected from YAG lasers and any other available types. The laser emitter unit 91 shown comprises a laser oscillator 911 and a laser emitter 912. The laser emitter 912 is oriented towards a bent area 14 of the flexible member 12.

The angular position modifying unit 92 bends the flexible member 12 for static angular positioning. For controlling the pitch angle, the angular position modifying unit 92 operates its movable arm 922 linearly in directions P1 (positive) or P2 (negative). For controlling the roll angle, the angular position modifying unit 92 rotates its movable arm 922 in directions R1 (positive) or R2 (negative). The angular position modifying unit 92 shown comprises a driver 921 including a motor and the movable arm 922 driven by the driver 921. The movable arm 922 holds the flexible member 12 for linear movement in the direction P1 or P2 and rotation in the direction R1 or R2. Alternatively, the movable arm 922 may travel in the direction P1 or P9 while being in contact with the flexible member 12 so that the flexible member 12 is driven for positioning at a desired pitch angle and a desired roll angle.

The displacement measuring unit 93 measures the displacement of the flexible member 12. The displacement measuring unit 93 is oriented towards, e.g., a pneumatic bearing side of the magnetic head 2. A detection signal produced by the displacement measuring unit 93 is transferred to the controller unit 94. The displacement measuring unit 93 shown comprises an image signal processor 931 and an imaging device 932. The imaging device 932 includes an imaging means such as a CCD.

The controller unit 94 is responsive to the detection signal from the displacement measuring unit 93 for controlling the action of the laser emitter unit 91 and the angular position modifying unit 92. The controller unit 94 may commonly incorporate a computer.

Figure 4:
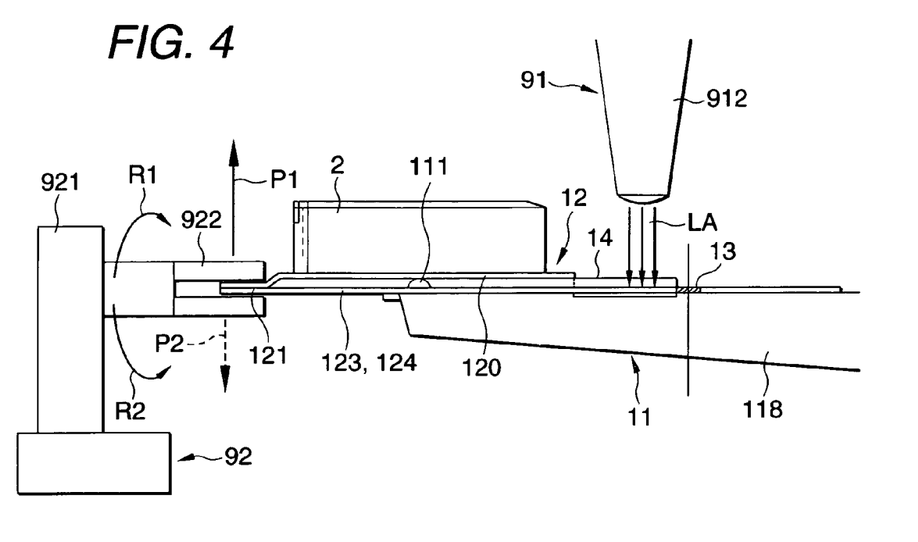
FIG. 4 is an enlarged view explaining a static angular position adjusting process of the static angular position adjusting apparatus shown in FIG. 1.

FIG. 4 is an enlarged view illustrating the static angular positioning action of the static angular position adjusting apparatus shown in FIG. 1. As shown in FIG. 4, the movable arm 922 of the angular position modifying unit 92 is driven to grip the cross portion 121 of the flexible member 12 and moved linearly in the direction P1 or P2. This causes the flexible member 12 to be bent in the direction P1 or P2. The degree of displacement determines the pitch angle.

The pitch angle is controlled by the action of mechanical bending in the prior art. The present invention allows the bent area 14 of the flexible member 12 to be exposed to the laser beam LA while stressed by a mechanical force.

Figure 5:
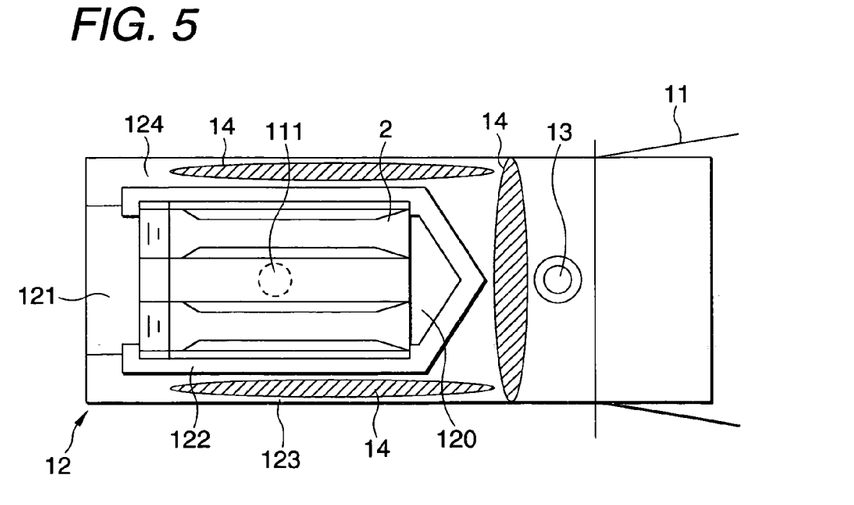
FIG. 5 is a view showing the irradiated areas with a laser beam in the static angular position adjusting process shown in FIG. 4.

FIG. 5 illustrates irradiated areas with the laser beam LA during the static angular positioning action shown in FIG. 4. As shown, the laser beam LA is fallen on the areas 14 of the flexible member 12 between the magnetic head 2 and the joint 13 between the flexible member 12 and the load beam 11. More specifically, the irradiated areas 14 with the laser beam LA are located on the rear and both sides of the magnetic head 2 where the bend is involved.

When the flexible member 12 is mechanically bent, its generates a stress equivalent to the degree of bend. According to the present invention, as the areas 14 on the flexible member 12 where the stress is produced are exposed to the laser beam LA, their stress is relieved by the heat of the laser beam LA. The areas 14 on the flexible member 12 exposed to the laser beam LA are hence decreased in the restoring effect and remain bent at a degree close to the original bending. This allows the flexible member 12 to remain bent at a noticeable degree even if its bending is minimum. In case that the areas 14 on the flexible member 12 exposed to the laser beam LA are made of stainless steel, the irradiation of the laser beam may preferably be carried out so that the irradiated areas are heated up to 150 to 250° C.

The areas 14 of the flexible member 12 between the magnetic head 2 and the joint 13 between the flexible member 12 and the load beam 11 are exposed to the laser beam LA. The flexible member 12 is bent throughout the irradiated areas. Accordingly, the bend of the flexible member 12 is directly translated to a pitch angle of the magnetic head 2. A significant change in the pitch angle can thus be derived from a small degree of the bend of the flexible member 12.

The displacement measuring unit 93 detects the bend of the flexible member 12 from a displacement of the pneumatic bearing surface of the magnetic head 2. The detection signal produced by the displacement measuring unit 93 is transferred to the controller unit 94. The controller unit 94 is responsive to the detection signal from the displacement measuring unit 93 for controlling the action of the laser emitter unit 91 and the angular position modifying unit 92.

The controller unit 94 has a table of bending angle data and upon detecting that the flexible member 12 is bent to a desired degree, cancels the action of the angular position modifying unit 92. As a result, the pitch angle can automatically be controlled. When the action of the angular position modifying unit 92 has been canceled, the laser oscillation of the laser emitter unit 91 may stop.

For controlling the roll angle, the movable arm 922 of the angular position modifying unit 92 is driven to grip the cross portion 121 of the flexible member 12 and then turned in the direction R1 or R2. This causes the flexible member 12 to be twisted in the direction R1 or R2.

While the flexible member 12 is mechanically twisted by the turning movement of the angular position modifying unit 92, its areas 14 between the magnetic head 2 and the joint 13 between the flexible member 12 and the load beam 11 are exposed to the laser beam LA.

When the flexible member 12 is twisted, it produces a stress equivalent to the twisting force. According to the present invention, the areas 14 of the flexible member 12 is irradiated by the laser beam LA and their stress can thus be relieved by the heat of the laser beam. The areas 14 on the flexible member 12 exposed to the laser beam LA are hence decreased in there storing effect and remain twisted at a degree close to the original twisting stress. This allows the flexible member 12 to remain twisted at a noticeable degree even if its twisting is minimum.

The areas 14 of the flexible member 12 between the magnetic head 2 and the joint 13 between the flexible member 12 and the load beam 11 are exposed to the laser beam LA. The flexible member 12 is then twisted throughout the irradiated areas. Accordingly, the twisting of the flexible member 12 is directly translated to a roll angle of the magnetic head 2. A significant change in the roll angle can thus be derived from a small degree of the twisting of the flexible member 12.

The displacement measuring unit 93 detects an angle of twisting of the flexible member 12 from a tilted or twisted angle of the pneumatic bearing surface of the magnetic head 2. The detection signal produce by the displacement measuring unit 93 is then transferred to the controller unit 94. The controller unit 94 is responsive to the detection signal from the displacement measuring unit 93 for controlling the action of the laser emitter unit 91 and the angular position modifying unit 92.

The controller unit 94 has a table of twisting angle data and upon detecting that the flexible member 12 is twisted to a desired degree, cancels the action of the angular position modifying unit 92. As a result, the roll angle can automatically be controlled. When the action of the angular position modifying unit 92 has been canceled, the laser oscillation of the laser emitter unit 91 may stop.

Figure 6:
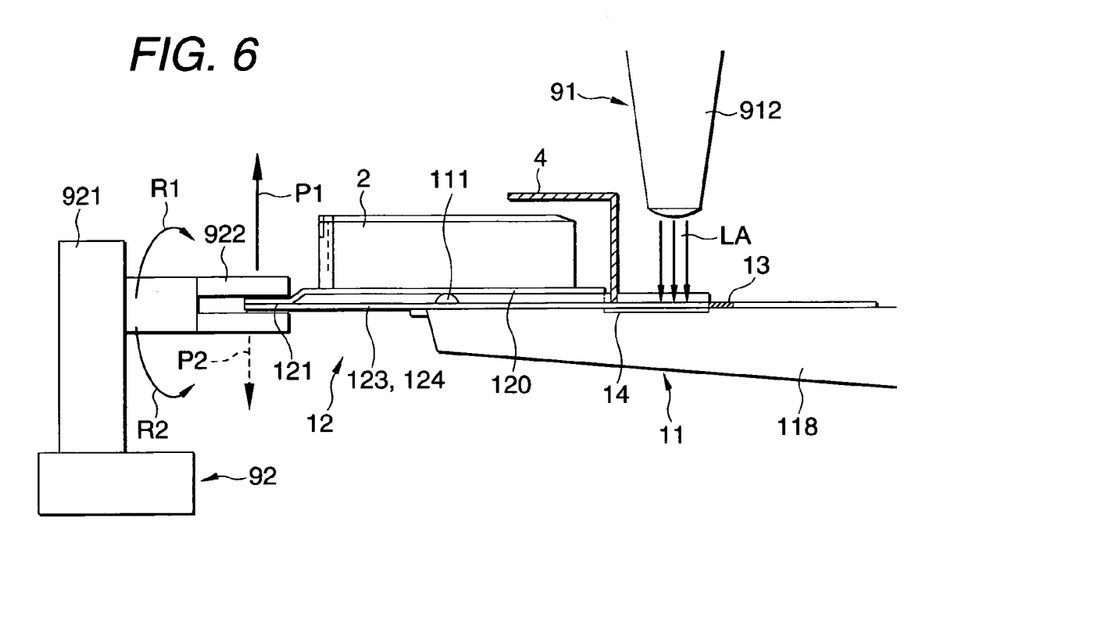
FIG. 6 is a view of another embodiment of the static angular position adjusting apparatus according to the present invention.

FIG. 6 illustrates another embodiment of the static angular position adjusting apparatus according to the present invention. In particular, the another embodiment employs a laser beam shielding means 4 which inhibits the laser beam LA from being fallen on the magnetic head 2. The laser beam shielding means 4 is provided for shielding a specific region to be protected from the laser beam LA, such as the magnetic head 2 and a pattern of the lead 3 but not be limited to the shape shown in this embodiment.

Figure 7:
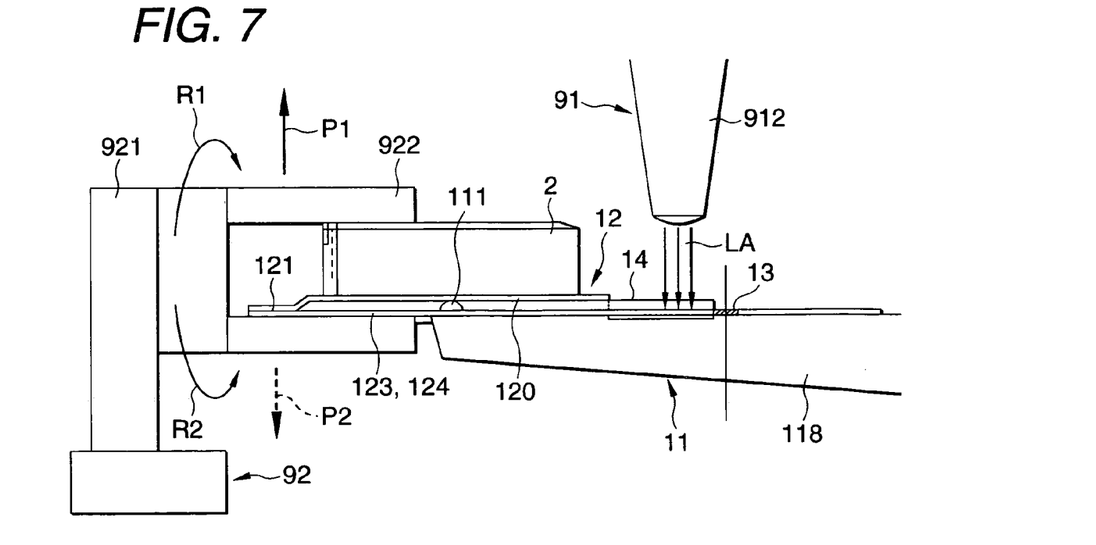
FIG. 7 is a view of a further embodiment of the static angular position adjusting apparatus according to the present invention.

FIG. 7 illustrates a further embodiment of the static angular position adjusting apparatus according to the present invention. Same components are denoted by same numerals as those described with the previous drawings. The further embodiment is featured by the fact that the movable arm 922 of the angular position modifying unit 92 is driven to grip the flexible member 12 and the magnetic head 2 together and moved linearly in the direction P1 or P2 and turned in the direction R1 or R2 for determining the pitch angle and the roll angle. In this embodiment, the same effect as of the previous embodiments shown in FIGS. 1 to 5 can be achieved. Alternatively, the arrangement shown in FIG. 7 maybe added with the laser beam shielding means shown in FIG. 6.

Figure 8:
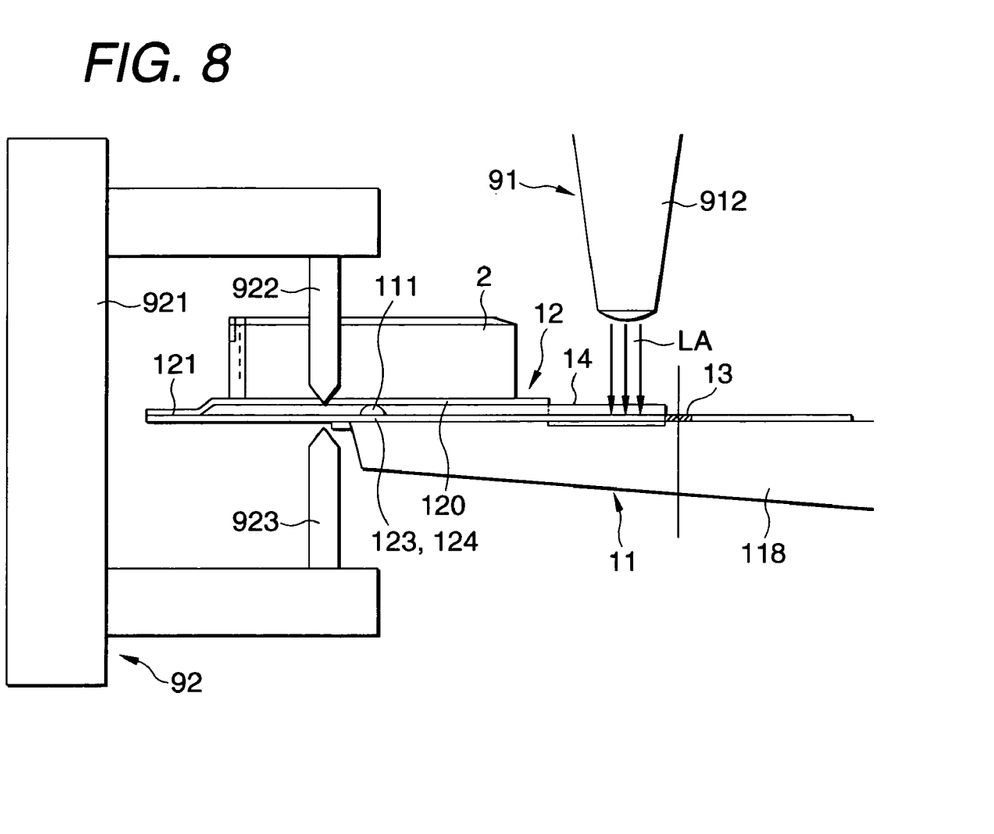
FIG. 8 is a view of a still further embodiment of the static angular position adjusting apparatus according to the present invention.
Figure 9:
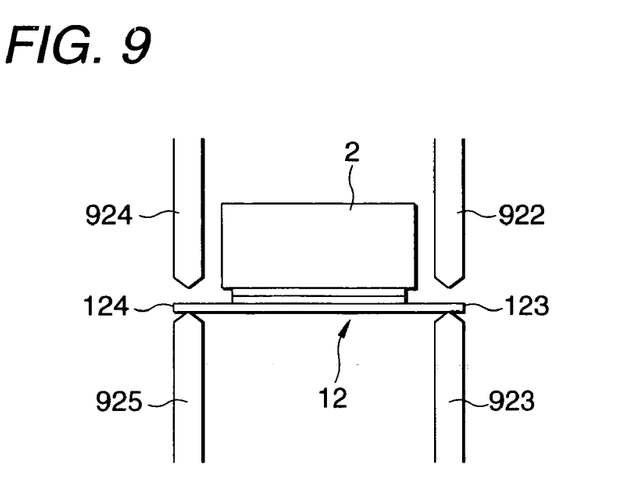
FIG. 9 is a left side view of the apparatus shown in FIG. 8.

FIG. 8 illustrates a still further embodiment of the static angular position adjusting apparatus according to the present invention. FIG. 9 is a left side view of the apparatus shown in FIG. 8. As shown, same components are denoted by same numerals as those shown in the previous embodiments. In this embodiment, the angular position adjusting apparatus 92 includes four movable arms 922 to 925. The movable arms 922 to 925 are pin-like members which have their distal ends arranged to be in direct contact with flange portions 123 and 124 of the flexible member 12. More particularly, the movable arms 922 and 924 are located at one side of the flexible member 12 (where the magnetic head 2 is mounted) while the movable arms 923 and 925 are located at the other side. As shown, each pair of the movable arms 922 and 923 or 924 and 925 are arranged, but not limited to, opposite to each other. Each pair of the movable arms may be arranged in different locations.

Figure 10:
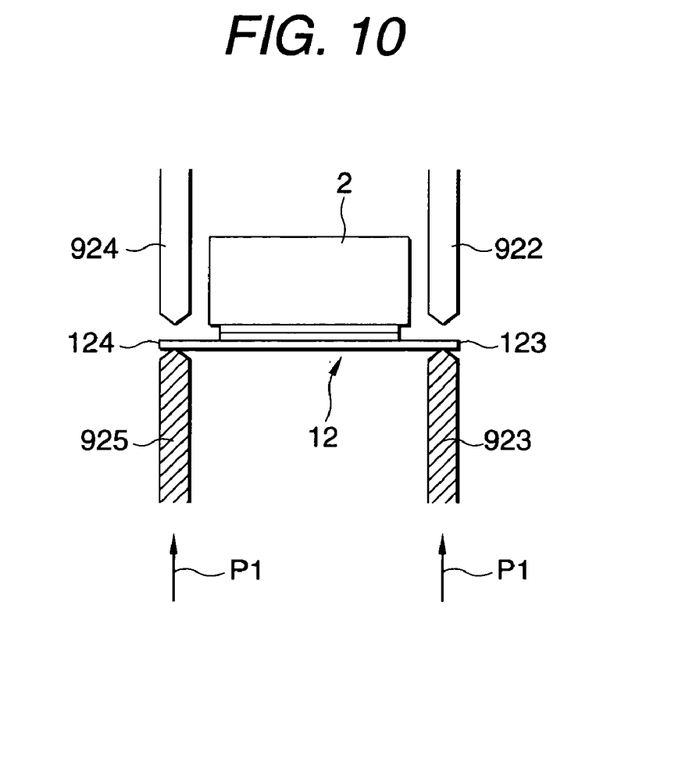
FIG. 10 is a view showing a pitch angle adjusting process in the static angular position adjusting apparatus shown in FIGS. 8 and 9.
Figure 11:
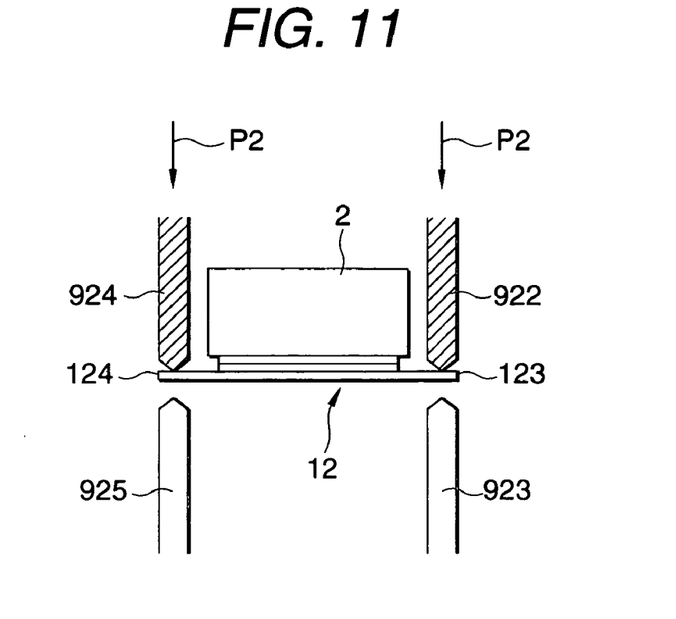
FIG. 11 is a view showing another pitch angle adjusting process in the static angular position adjusting apparatus shown in FIGS. 8 and 9.

FIGS. 10 and 11 illustrate a method of adjusting the pitch angle in the angular position adjusting apparatus shown in FIGS. 8 and 9. Referring to FIG. 10, the movable arms 923 and 925 are moved linearly in the direction P1 to press with their distal ends the flange portions 123 and 124 of the flexible member 12 for determining the pitch angle. In this case, the direction P1 is a positive direction for controlling the pitch angle.

FIG. 11 illustrates adjustment of the pitch angle in the negative direction P2. As the movable arms 922 and 924 are moved linearly in the direction P2, their distal ends press against the flange portions 123 and 124 of the flexible member 12. This permits the pitch angle to be adjusted in the negative direction P2.

Figure 12:
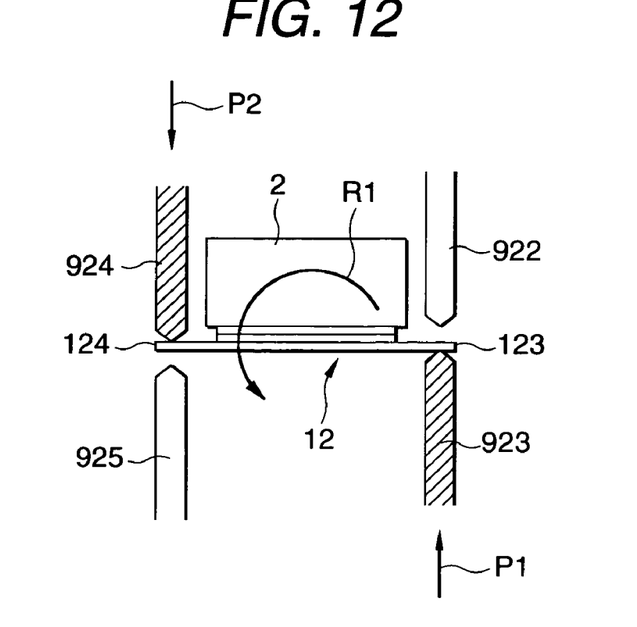
FIG. 12 is a view showing a roll angle adjusting process in the static angular position adjusting apparatus shown in FIGS. 8 and 9.
Figure 13:
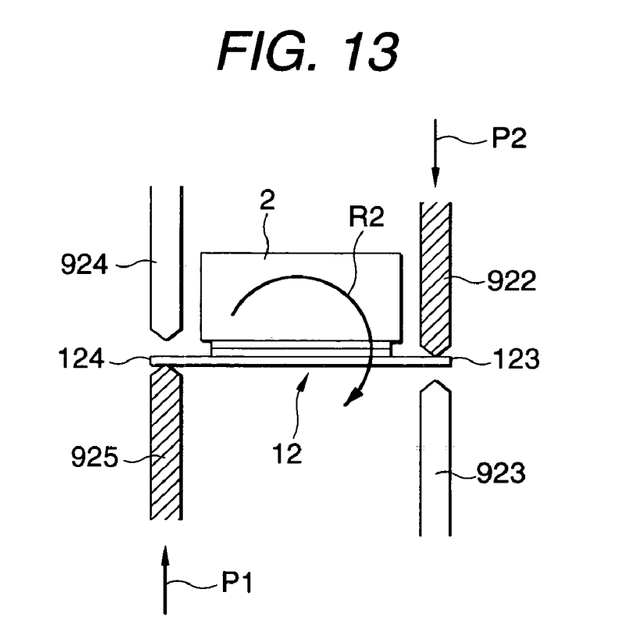
FIG. 13 is a view showing another roll angle adjusting process in the static angular position adjusting apparatus shown in FIGS. 8 and 9.

FIGS. 12 and 13 illustrate a method of adjusting the roll angle in the angular position adjusting apparatus shown in FIGS. 8 and 9. Referring to FIG. 12, as the movable arm 923 is moved linearly in the direction PI, its distal end presses against the flange portion 123 of the flexible member 12. Simultaneously, the movable arm 924 is moved linearly in the direction P2 to press with its distal end the flange portion 124 of the flexible member 12. This permits the roll angle to be corrected in the direction R1. In this case, the direction R1 is a positive direction for controlling the roll angle.

FIG. 13 illustrates adjustment of the roll angle in the negative direction R2. While the movable arm 922 is moved linearly in the direction P2 to press with its distal end the flange portion 123 of the flexible member 12, the movable arm 925 is moved linearly in the direction P1 to press with its distal end the flange portion 124 of the flexible member 12. This permits the roll angle to be adjusted in the negative direction R2.

During the processes of adjusting the pitch angle and the roll angle shown in FIGS. 10 to 13, the bent areas 14 (FIG. 8) of the flexible member 12 are also exposed to the laser beam LA by the manner described previously.

The advantage of the present invention will now be explained in more detail referring to the measurements. Table 1 shows the relationship between the adjustment (mm) and the a change in the pitch angle (min). Shown in Table 1 are measurements of the positive adjustment (mm) which represents a displacement of the flexible member 12 when the movable arm 922 of the angular position modifying unit 92 is driven in the direction P1 in the static angular position adjusting apparatus shown in FIGS. 1 to 5 and measurements of the negative adjustment (mm) which represents a displacement of the flexible member 12 when the movable arm 922 is driven in the direction P2. When the flexible member 12 receives no load from the movable arm 922, the adjustment is 0 (mm). In Table 1, "no laser" means that the areas 14 of the flexible member 12 are not irradiated by the laser means LA (as in the prior art) and "with laser" means that the areas 14 of the flexible member 12 are irradiated by the laser means LA.

TABLE 1

| Pitch adjustment | Pitch angle change (min) | |
|---|---|---|
| (mm) | No laser | With laser |
| −0.7 | −51.05 | −118.63 |
| −0.6 | −36.75 | −91.25 |
| −0.5 | −25.46 | −68.30 |
| −0.4 | −15.08 | −46.70 |
| −0.3 | −5.16 | −24.58 |
| −0.2 | −3.32 | −15.92 |
| −0.1 | −1.75 | −8.68 |

TABLE 1-continued

| Pitch adjustment | Pitch angle change (min) | |
|---|---|---|
| (mm) | No laser | With laser |
| 0 | | |
| 0.1 | 1.03 | 6.29 |
| 0.2 | 2.62 | 9.58 |
| 0.3 | 8.40 | 18.60 |
| 0.4 | 14.06 | 24.38 |
| 0.5 | 18.54 | 36.98 |
| 0.6 | 25.68 | 52.46 |
| 0.7 | 32.74 | 68.84 |
| 0.8 | 41.85 | 94.74 |

Figure 14:
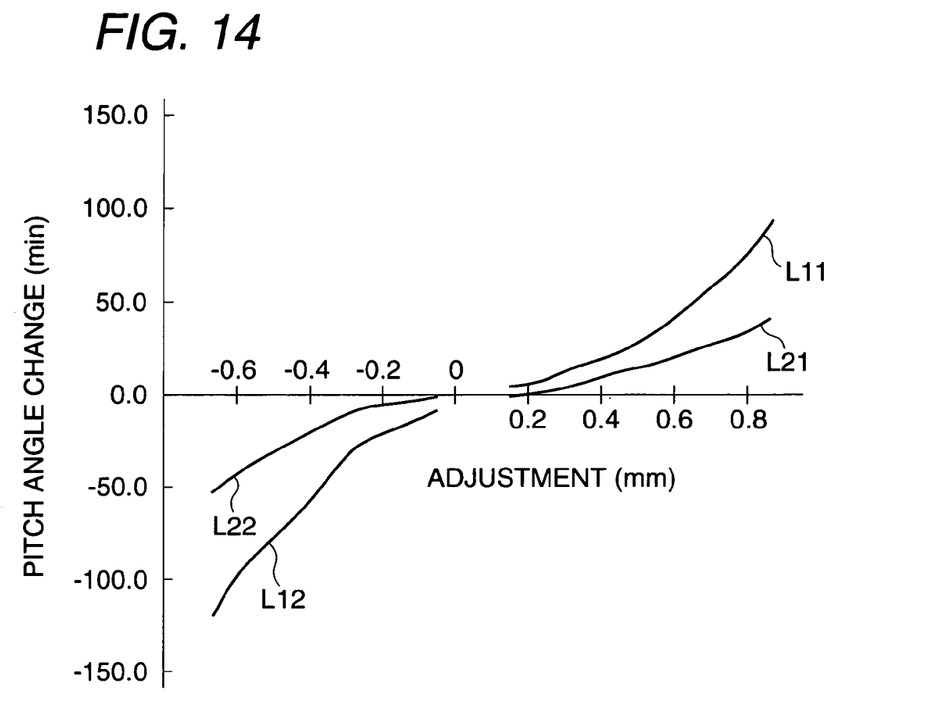
FIG. 14 is a graphic diagram showing the measurements of Table 1.

FIG. 14 is a graphic diagram showing characteristic profiles of the measurements of Table 1. In FIG. 14, the horizontal axis represents the adjustment (mm) and the vertical axis represents the pitch angle change (min). The two curves L11 and L12 in FIG. 14 are the profile of "with laser" in Table 1. Also, the two curves L21 and L22 are the profile of "no laser".

As apparent from Table 1 and the FIG. 14, the "with laser" profile (at L11 and L12) is smaller in the adjustment on the flexible member 12 but greater in the pitch angle change than the "no laser" profile (at L21 and L22). When the adjustment is −0.4 (mm), the pitch angle change becomes −15.08 (min) at the "no laser" profile but as substantially three Limes greater as −46.70 (min) at the "with laser" profile. Also, when the adjustment is 0.8 (mm), the pitch angle change becomes 41.85 (min) at the "no laser" profile but as substantially 2.5 times greater as 94.74 (min) at the "with laser" profile.

Table 2 shows the relationship between the adjustment (dig) and the roll angle change (min). Shown in Table 2 are measurements of the positive adjustment (dig) which represents an angular displacement of the flexible member 12 when the movable arm 922 of he angular position modifying unit 92 is turned in the direction R1 in the static angular position adjusting apparatus shown in FIGS. 1 to 5 and measurements of the negative adjustment (dig) which represents an angular displacement of the flexible meaner 12 when the movable arm 922 is turned in the direction R2. When the flexible member 12 receives no load from the movable arm 922, the adjustment is 0 (dig). In Table 2, "no laser" means that the areas 14 of the flexible member 12 are not irradiated by the laser means LA (as in the prior art) and "with laser" means that the areas 14 of the flexible member 12 are irradiated by the laser means LA.

TABLE 2

| Roll angle | Roll angle change (min) | |
|---|---|---|
| adjustment (dig.) | No laser | With laser |
| 30 | 6.64 | 35.83 |
| 20 | 1.85 | 16.74 |
| 10 | 1.24 | 4.69 |
| 0 | | |
| −10 | −0.82 | −5.12 |
| −20 | −1.37 | −17.59 |
| −30 | −4.51 | −36.94 |

Figure 15:
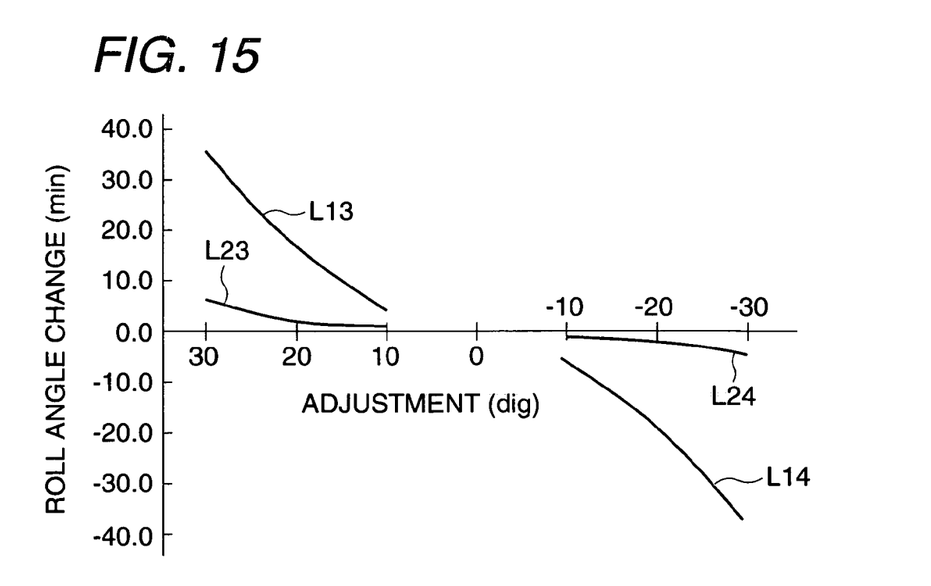
FIG. 15 is a graphic diagram showing the measurements of Table 2.

FIG. 15 is a graphic diagram showing characteristic profiles of the measurements of Table 2. In FIG. 15, the horizontal axis represents the adjustment (dig) and the vertical axis represents the roll angle change (min). The two curves L13 and L14 in FIG. 15 are the profile of "with laser" in Table 2. Also, two curves L23 and L24 are the profile of "no laser".

As apparent from Table 2 and the FIG. 15, the "with laser" profile (at L13 and L14) is smaller in the angular adjustment on the flexible member 12 but greater in the roll angle change than the "no laser" profile (at L23 and L24). When the adjustment is 10 (dig), the roll angle change becomes 1.24 (min) at the "no laser" profile but as substantially four times greater as 4.69 (min) at the "with laser" profile. Also, when the adjustment is 30 (dig), the roll angle change becomes 6.64 (min) at the "no laser" profile but as substantially five times greater as 35.83 (min) at the "with laser" profile.

As set forth above, the method and apparatus for adjusting the static angular position of a magnetic head unit according to the present invention are capable o producing a significant change in the static angular position from a small displacement of the flexible member.

What is claimed is:

1. A method of adjusting the static angular position of a magnetic head unit which includes a head support and a magnetic head, the head support including a flexible member to which the magnetic head is linked, the method comprising:
   holding the flexible member with an angular position modifying unit;
   forming a bend in an area of the flexible member using the angular position modifying unit for adjusting the static angular position; and
   irradiating a laser beam onto the area of the flexible member while the bend is applied.

2. The method of adjusting the static angular position of a magnetic head unit according to claim 1, wherein the head support includes a load beam which has a free end, and the flexible member is jointed at one side to the free end of the load beam and at the other side to the magnetic head, said method further comprising the step of:
   irradiating the laser beam onto areas of the flexible member, where the bend is applied, between the magnetic head and the joint between the flexible member and the load beam.

3. The method of adjusting the static angular position of a magnetic head unit according to claim 2, wherein the load beam has a projection provided thereon adjacent to the free end, and the flexible member is mounted to a side of the load beam where the projection is provided and arranged for receiving a press from the projection.

4. An apparatus for adjusting the static angular position of a magnetic head unit comprising:
   a magnetic head unit having a head support and a magnetic head, the head support including a flexible member to which the magnetic head is mounted;
   a moveable arm holding the flexible member;
   an angular position modifying unit including the moveable arm, to form a bend in an area of the flexible member to adjust the static angular position; and
   a laser emitter unit to irradiate a laser beam onto the area of the flexible member while the bend is applied.

5. The apparatus according to claim 4, wherein the head support includes a load beam which has a free end, the flexible member is jointed at one side to the free end of the load beam and at the other side to the magnetic head, and the laser emitter unit irradiates the laser beam onto areas of the flexible member, where the bend is applied, between the magnetic head and the joint between the flexible member and the load beam.

6. The apparatus according to claim 4, further comprising:
   a displacement measuring unit for detecting the bend of the flexible member; and
   a controller unit for controlling the action of the laser emitter unit and the angular position modifying unit based on a detection signal from the displacement measuring unit.

7. The apparatus according to claim 5, further comprising:
   a displacement measuring unit for detecting the bend of the flexible member; and
   a controller unit for controlling the action of the laser emitter unit and the angular position modifying unit based on a detection signal from the displacement measuring unit.

8. The apparatus according to claim 5, further comprising:
   a displacement measuring unit for detecting the bend of the flexible member; and
   a controller unit for controlling the action of the laser emitter unit and the angular position modifying unit based on a detection signal from the displacement measuring unit.

9. The apparatus according to claim 5, further comprising a laser beam shielding means for shielding a protected region from the laser beam.

10. The apparatus according to claim 4, wherein said angular position modifying unit includes movable arm driven to grip the flexible member and the magnetic head together.

11. The apparatus according to claim 5, wherein said angular position modifying unit includes movable arm driven to grip the flexible member and the magnetic head together.

12. An apparatus for adjusting the static angular position of a magnetic head unit comprising:
   a magnetic head unit having a head support and a magnetic head, the head support including a flexible member to which the magnetic head is mounted;
   a moveable arm holding the flexible member;
   an angular position modifying unit including the moveable arm, to form a bend in an area of the flexible member to adjust the static angular position; and
   a laser emitter unit to irradiate a laser beam onto the area of the flexible member while the bend is applied, wherein said angular position adjusting apparatus includes four movable arms which are pin-like members, distal ends of which are arranged to be in direct contact with flange portions of the flexible member.

13. An apparatus for adjusting the static angular position of a magnetic head unit comprising:
   a magnetic head unit having a head support and a magnetic head, the head support including a flexible member to which the magnetic head is mounted;
   a moveable arm holding the flexible member;
   an angular position modifying unit including the moveable arm, to form a bend in an area of the flexible member to adjust the static angular position; and
   a laser emitter unit to irradiate a laser beam onto the area of the flexible member while the bend is applied,
   wherein the head support includes a load beam which has a free end, the flexible member is jointed at one side to the free end of the load beam and at the other side to the magnetic head, and the laser emitter unit irradiates the laser beam onto areas of the flexible member, where the bend is applied, between the magnetic head and the joint between the flexible member and the load beam, and wherein said angular position adjusting apparatus includes four movable arms which are pin-like members, distal ends of which are arranged to be in direct contact with flange portions of the flexible member.

* * * * *